(12) United States Patent
Ancelin

(10) Patent No.: US 8,170,347 B2
(45) Date of Patent: May 1, 2012

(54) ROI-BASED ASSESSMENT OF ABNORMALITY USING TRANSFORMATION INVARIANT FEATURES

(75) Inventor: Bruno Ancelin, Oxford (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1177 days.

(21) Appl. No.: 11/898,047

(22) Filed: Sep. 7, 2007

(65) Prior Publication Data

US 2008/0069446 A1 Mar. 20, 2008

(30) Foreign Application Priority Data

Sep. 7, 2006 (GB) .................................. 0617515.2

(51) Int. Cl.
*G06K 9/68* (2006.01)

(52) U.S. Cl. ...................................................... 382/218

(58) Field of Classification Search .................. 382/218, 382/219–222
See application file for complete search history.

(56) References Cited

U.S. PATENT DOCUMENTS

| 2005/0165290 A1* | 7/2005 | Kotsianti et al. ............. 600/407 |
| 2005/0215889 A1 | 9/2005 | Patterson, II |
| 2005/0273007 A1 | 12/2005 | Burbar |

OTHER PUBLICATIONS

British Search Report dated Jun. 12, 2007 (Four (4) pages).
K. Herholz et al., "Criteria for the Diagnosis of Alzheimer's Disease with Positron Emission Tomography", Dementia, 1990, pp. 156-164, vol. 1, S. Karger AG, Basel.
K. Herholz et al., "Comparability of FDG PET Studies in Probable Alzheimer's Disease", Sep. 1993, pp. 1460-1466, vol. 34, No. 9, Germany.

* cited by examiner

*Primary Examiner* — Aaron W Carter
(74) *Attorney, Agent, or Firm* — Crowell & Moring LLP

(57) ABSTRACT

A method and apparatus of comparing the results of medical imaging by, for example, PET scanning dispenses with the need for intensity normalization. The relationships between features extracted from relevant regions of interest in the image are studied. In one example, mean intensities in the principle brain lobes are compared to each other and a short image ID is constructed and used to derive population statistics and diagnosis. The population statistics are compared with 'reference' statistics in order to assess abnormality. Comparison by a number of methods is possible, and the invention further provides concerns a novel voting mechanism which derives abnormality scores for each region.

12 Claims, 7 Drawing Sheets

(4 of 7 Drawing Sheet(s) Filed in Color)

ROI-BASED ASSESSMENT OF ABNORMALITY USING TRANSFORMATION INVARIANT FEATURES

BACKGROUND OF THE INVENTION

The invention is concerned with the assessment of images obtained from functional medical scanning procedures such as Positron Emission Tomography (PET) or Single Photon Emission Computed Tomography (SPECT) and, in particular, with the comparison of such images with a set of reference images.

Alzheimer's Disease (AD) is becoming one of the major health concerns in developed countries that have ageing populations. As Positron Emission Tomography is believed to be a useful imaging modality for diagnosis operations related to AD, the USA and some European countries have started reimbursing this type of examination, in the case of the USA, to differentiate AD from Fronto-Temporal Dementia (FTD).

PET can be used with a variety of tracers. The resulting images will show different physiological functions. 2-[18-F] fluoro-2-deoxy-D-glucose (FDG) has been extensively utilized in PET in several clinical situations as a marker of glucose metabolism. In neurology, uptake of glucose in the brain has been correlated to brain activity and function.

In the case of the diagnosis of Alzheimer's Disease, low activity patterns in some lobes of the cortex can be interpreted as indicative of Alzheimer's disease. Due to several factors, the interpretation of FDG brain scans remains challenging and for AD, only autopsy results are considered the most reliable test for AD. Therefore, most cases are currently diagnosed as "probable AD". The difficulty resides in the identification of the dementia itself, which with FDG PET could be confirmed to a more reliable level, and more importantly, the differentiation between different types of dementia, as each type is covered with different patient management (medication, care, etc.).

In a clinical context, the clinician will use a number of elements to perform a diagnosis. These include various neurological tests, psychological tests (such as the Mini Mental State Examination or MMSE) and assessment based on PET or SPECT images of the brain. The FDG PET image reveals patterns of glucose metabolism and the SPECT image shows patterns of perfusion (amount of blood supply): in both cases, abnormal levels of perfusion or metabolism can be indicators of dementia.

When a clinician assesses, for example, a PET image of the brain for potential brain diseases, he or she will be looking at patterns of hypo-metabolism (low intensity on the PET image) or hyper-metabolism (high intensity on the PET). The symmetry of the brain is also an important factor. FIG. 1 shows two FDG-PET images: one of a normal case (left) and one of an advanced AD case (right). For each case, an axial (top), coronal (middle) and sagittal (bottom) slice is shown. The arrows point to the areas of hypo-metabolism noticeable in the PET image.

A range of software tools have been developed to help clinicians reach a diagnosis. These include Neurogam (produced by Segami Corporation, 8325 Guilford Road, Suite B, Columbia, Md. 21046, USA), NeuroQ (produced by Syntermed, Inc., Tower Place Center, 3340 Peachtree Road, NE, Suite 1800, Atlanta, Ga. 30326) BRASS (produced by Hermes Medical Solutions, Skeppsbron 44, 111 30 Stockholm, Sweden) and Scenium (produced by Siemens Medical Solutions, Siemens House, Oldbury, Bracknell, Berkshire RG12 8FZ, United Kingdom) for the commercially available products and NeuroSTAT (Prof. Minoshima, University of Washington, USA) and SPM (University of Washington, School of Medicine, Radiology, 1959 N.E. Pacific Street, RR215, Box 357115, Seattle, Wash. 98195-7115, United States) for the academic packages. SPM stands for Statistical Parametric Mapping and designates both the software package and the class of methods using statistical parametric maps.

All available tools follow a similar workflow and processing algorithm with two variants: the analysis is either voxel-based (Neurogam, SPM, NeuroSTAT) or ROI-based (NeuroQ, BRASS). Examples of both approaches are described in the following sections.

All methods involve registering all available data spatially to a reference dataset so that one can assume that physiologically corresponding regions are in spatial correspondence between patients. All methods also involve collecting a set of "normal" images (or control cases) and evaluating their statistical properties as a group.

Using SPM, a group of normal images is collected and registered to a standard spatial reference. The images are then smoothed, normalized for intensity scale (using various methods) and a mean and standard deviation volumes are created. These two volumes, considered as a pair, are called the statistical reference.

Using Gaussian random field theory and assuming the local intensities in normal cases follow a Gaussian distribution, one can calculate the probability of any pixel intensity in a test image (a patient case) exceeding a certain intensity value.

Assessing a test image comprises the following steps:
the test image is registered to the reference;
the test image is smoothed;
the test image is normalized in intensity; this involves rescaling the intensities in the image using as a reference either the average intensity in a particular region or the average intensity in the whole brain with some optional variations.

At this stage, the test image is deemed comparable to the statistical reference and can then be positioned against the mean and standard deviation volumes.

the corresponding Z-scores (Z=(X−mean)/standard deviation) are calculated for each voxel, creating a Z-volume; Z-scores are also occasionally called T-scores depending on the exact mathematical hypotheses made. The two terms will be used indifferently in this document.

the maximal Z-score is calculated in the volume. Volumes that bear absolute Z-scores above a threshold corresponding to a pre-determined p-value for the volume can be considered abnormal with a certain confidence rating (usually 95%, for a p-value of 0.05).

In practical terms, the volumes considered abnormal are classified as potential AD cases.

SPM has the advantage that the mathematical basis of this approach is sound and based on simple hypotheses. Moreover, abnormality is measured on a voxel-basis.

On the other hand, the Gaussian model is most probably not very well realized; therefore the accuracy of the computed p-values may be illusory (i.e. it works perfectly in the ideal case but it is not clear what happens when there are deviations from the model).

Because the image is not calibrated to real physiological values of uptake, the process necessitates a linear intensity normalization step: the intensity values are divided by the average intensity in a pre-selected reference region of the brain. A number of variations exist including robust means or other mathematical tools. The purpose of this step is to try to measure the physiological activity represented by the intensity where the measured intensity value has been affected by factors such as patient weight, injection dose, etc. This makes the algorithm inevitably sensitive to variations in the regions used as a reference. The idea is similar to that of Standard Uptake Value (SUV) used routinely in clinical PET for oncology. SUV is not deemed to be sufficiently robust for neurology, which is why a more specific method needs to be implemented.

The fine detail of the abnormality map is sensitive to registration artefacts or inaccuracies.

The smoothing applied implies that the Z-maps are extremely regular and therefore, region-based assessment may be more relevant than observation of individual voxel Z-scores.

The NeuroQ approach to ROI scoring is similar to the one previously described except that intensities are measured as the average intensity in each ROI (usually, 10 to 100 ROIs are considered). Typically, these regions of interest correspond to anatomically relevant regions (see FIG. 2). Each ROI has thus a normal range of intensities (described by a mean and standard deviation pair). The intensities of the patient ROIs are positioned in relation with that of the statistical reference. Any ROI for which the Z-score exceeds a preset threshold is considered abnormal.

Previous work in this field has used selected ratios of ROI average intensities to assist in the analysis of medical images (e.g. Herholz K, Adams R, Kessler J, Szelies B, Grond M, Heiss W D, Criteria for the diagnosis of Alzheimer's disease with positron emission tomography, Dementia 1990; 1:156-164).

Another publication, Herholz K, Perani D, Salmon E, Franck G, Fazio F, Heiss W D, Comar D. (1993) Comparability of FDG PET studies in probable Alzheimer's disease. Journal of Nuclear Medicine 34:1460-1466, describes how ratios of carefully selected relevant regions have been computed as well as inhomogeneous ratios (metabolic ratio) involving blood measurements.

SUMMARY OF THE INVENTION

The invention derives how relevant each region (referred to previously) is, and quantifies the contribution of each ratio accordingly. It can therefore be applied directly to other disease states (Fronto-Temporal dementia, Mild Cognitive Impairment) and to other body parts or imaging modalities. According to the invention, a method of comparing a functional medical scan image with a set of reference images comprises the following steps: defining a set of regions of interest (ROIs) in the test image and a corresponding set of ROIs in each of the reference images; for each ROI in each image, calculating the value of a chosen linear feature for each image, calculating a set of ratios given by dividing the value of said linear feature in an ROI with the value of said linear feature in another ROI within the same image and performing statistical analysis of the distribution of ratios to compare the test image to the reference images.

SPM-based methods tend to be sensitive to image smoothness, variations in overall intensity, registration and only assess patients or populations in a "normal" (part of a normal reference population) or "abnormal" (not part of the normal reference population) classification: either the patient is statistically significantly different from the population it is compared to, or it is not. In its simplest embodiment, the invention addresses all of these issues except the last; a preferred embodiment enables the classification of images as "normal or AD" (i.e. more likely to belong to one reference population or the other) by using two reference populations instead of one. This yields an improved classification performance.

Other objects, advantages and novel features of the present invention will become apparent from the following detailed description of the invention when considered in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

In particular, the invention is described in the context of FDG PET and glucose metabolism, but it can be applied without restriction to PET using tracers other than FDG or to perfusion SPECT as well.

The method of the invention studies the relationships between features extracted from relevant ROIs in the images. In the examples given, mean intensities in the principal brain lobes are compared to each other and a short image ID is constructed and used to derive population statistics and diagnosis. The overall process is described in the following paragraphs.

Building on the method of ROI scoring described with reference to NeuroQ, each image is reduced to a vector of average intensities in a pre-determined group of ROIs (about twenty regions are used, essentially covering the main lobes of the cortex). For an image denoted I, v(I) is defined as the corresponding vector of average intensities as measured in the chosen N ROIs. These values are then subject to the intensity normalization problem. To avoid this problem, v(I) is transformed into a ratio vector v'(I) by considering all possible pairs within v(I). Mathematically, the transformation can be written as:

$$v(I)=(u(1),\ldots,u(N))\to v'(I)=(u(1)/u(2),\ldots u(1)/u(N), u(2)/u(1), u(2)/u(3),\ldots u(2)/u(N),\ldots u(N)/u(1),\ldots u(N)/u(N-1))$$

Note that if one of the u(i) is included in the output vector, the transformation is invertible (if considered on non-zero values). The idea is that v' (as defined above) contains all the information contained in v (except for the absolute intensity scale) and is invariant with scaling of the input image I.

In general, any feature function u( ) that scales linearly with the image intensities can be usefully combined with this method. In the rest of this document, we will term such feature a "linear feature". Mathematically, these are any function u( ) that takes an image I and an ROI i, returns a scalar and satisfies:

$$u(\lambda.I,i)=\lambda.u(I,i)$$

Figure 1:
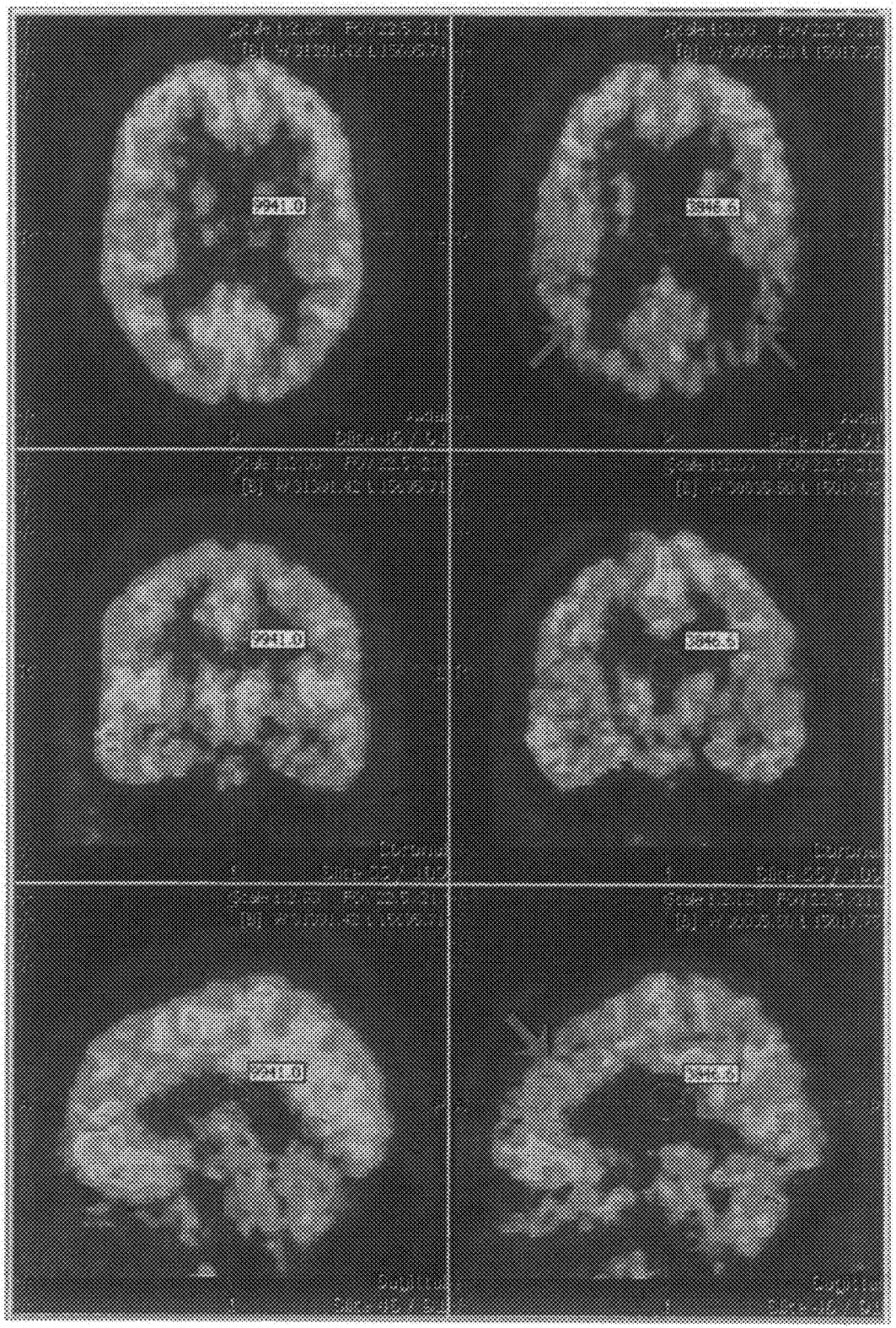
FIG. 1 shows a variety of slices of a PET image.
Figure 2:
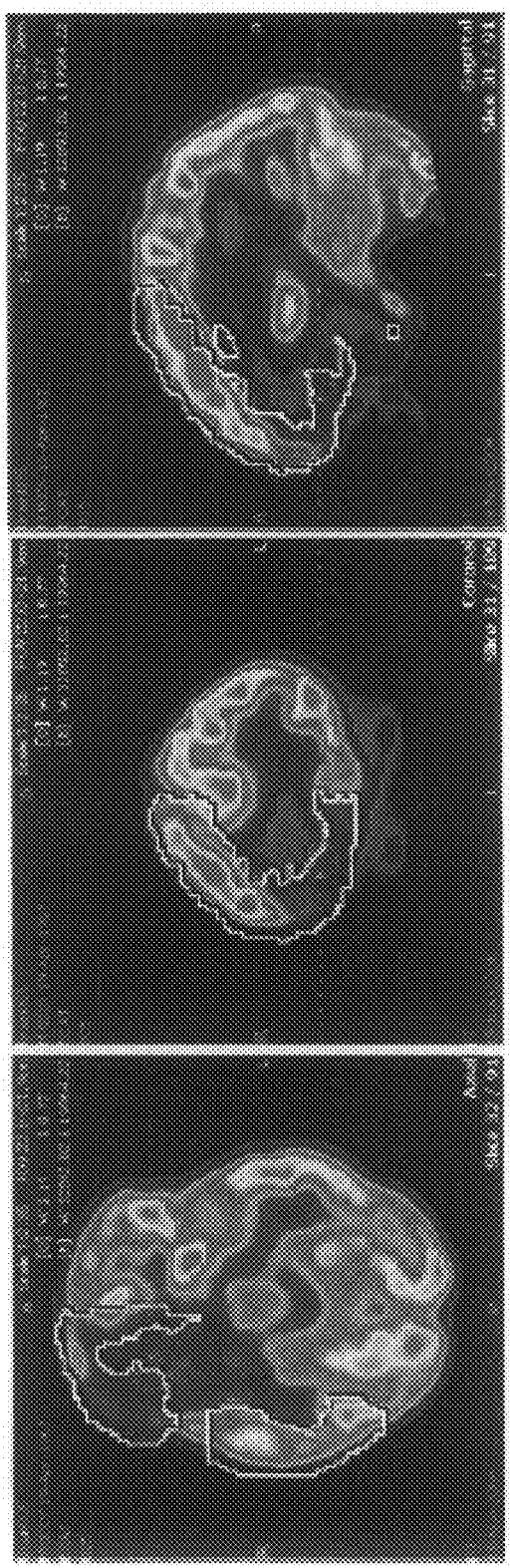
FIG. 2 shows an example of brain image with two regions of interest: frontal lobe (FL), parietal lobe (FL)
Figure 3:
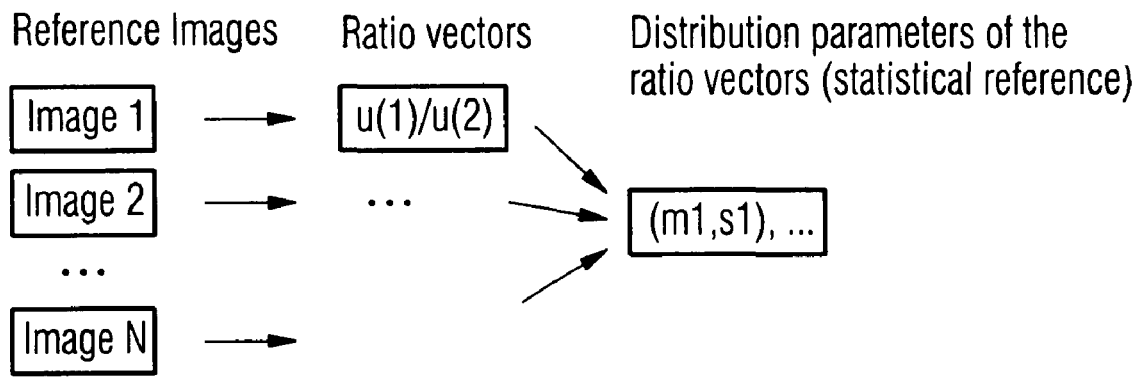
FIG. 3 illustrates the processing of image data according to the invention and the subsequent modelling of the processed data.

The statistical distribution of V in the reference set is modelled, that is the distribution is assumed to fit a known mathematical model and the parameters of the distribution so fitted are calculated. Denoting v'(I) as the v' coefficients corresponding to an image I, experience shows that the coefficients of v' are as Gaussian as those of v in the basic ROI method NeuroQ. Using such a model is equivalent to modelling what one could think the trained human eye will consider being a normal overall intensity ratio between pairs of regions. This is illustrated in FIG. 3.

Figure 4:
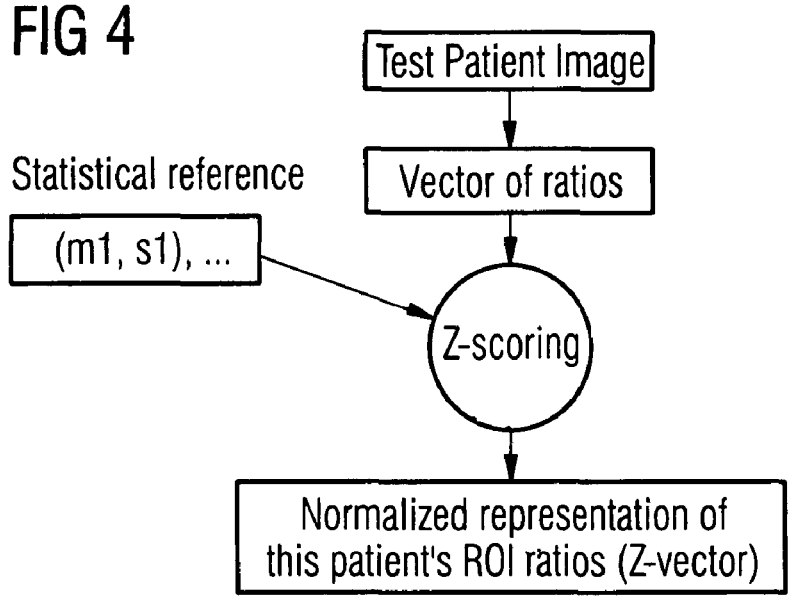
FIG. 4 illustrates the comparison of test data with the modelled distribution of reference data.

A test patient image I is transformed into v'(I) and each coefficient of v' is scored (Z-scored) against the measured distribution of the corresponding coefficient in the statistical reference. The test patient is then represented as a Z-vector representing the normalized abnormality level of each intensity ratio. This is illustrated in FIG. 4.

The procedure described thus far identifies abnormal ratios but the fact that a single ratio is abnormal is not in itself very significant and it would be inappropriate to make a judgement based on individual coefficients. Instead, a transformation can be used to "vote" the z-coefficients from the v' space into the v space. This is done by creating a "score bin" for each ROI and adding to it the Z-scores of all coefficients involving this ROI.

The underlying idea is that if, for example, one region is "abnormal", all the regions related to it will simultaneously vote towards the abnormality of that region. A residual vote will be observable in all the related regions but it will be small by one order of magnitude.

Figure 5:
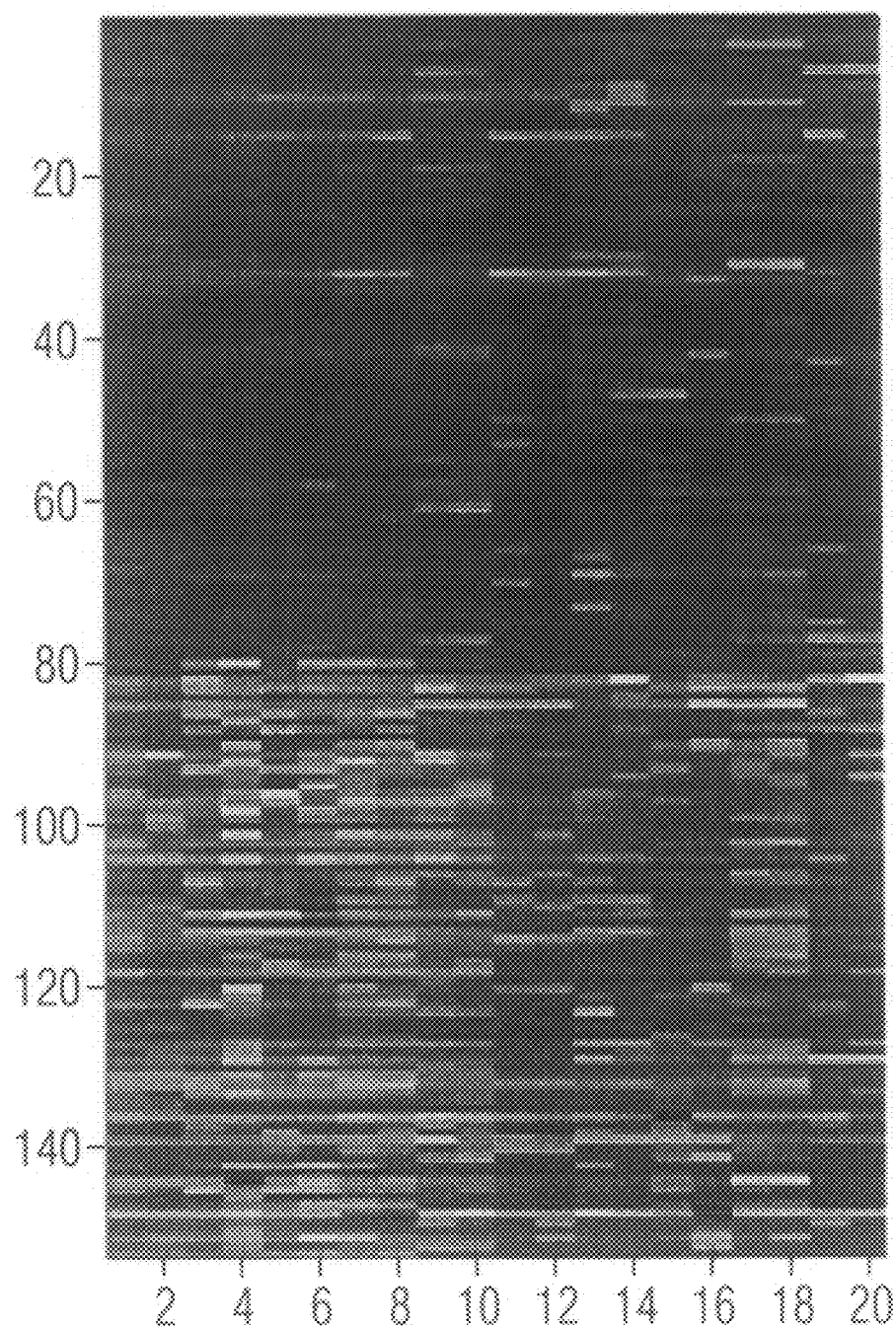
FIG. 5 is a graphic illustration of the abnormality scoring applied to various image regions for a number of test cases compared with a normal population according to the invention.

The result of this algorithm is represented in the FIG. 5 in which a line represents the vote map for a particular test case and each column corresponds to one region. For this example, 30 normal cases were chosen and used as a reference. The figure represents the vote maps for 78 additional normal cases and 78 AD cases.

To decide whether a case is normal or abnormal, one can decide upon a threshold to be applied to the max of the ROI abnormality scores (after the vote). The performance of such a system reaches 80/80 (sensitivity specificity) on the data used with an Area Under the Curve (AUC) of 0.90 (see FIG. 6). This corresponds to the best performance of the systems tested for current state of the art commercial systems available and the method has only been evaluated on affine registration.

Figure 6:
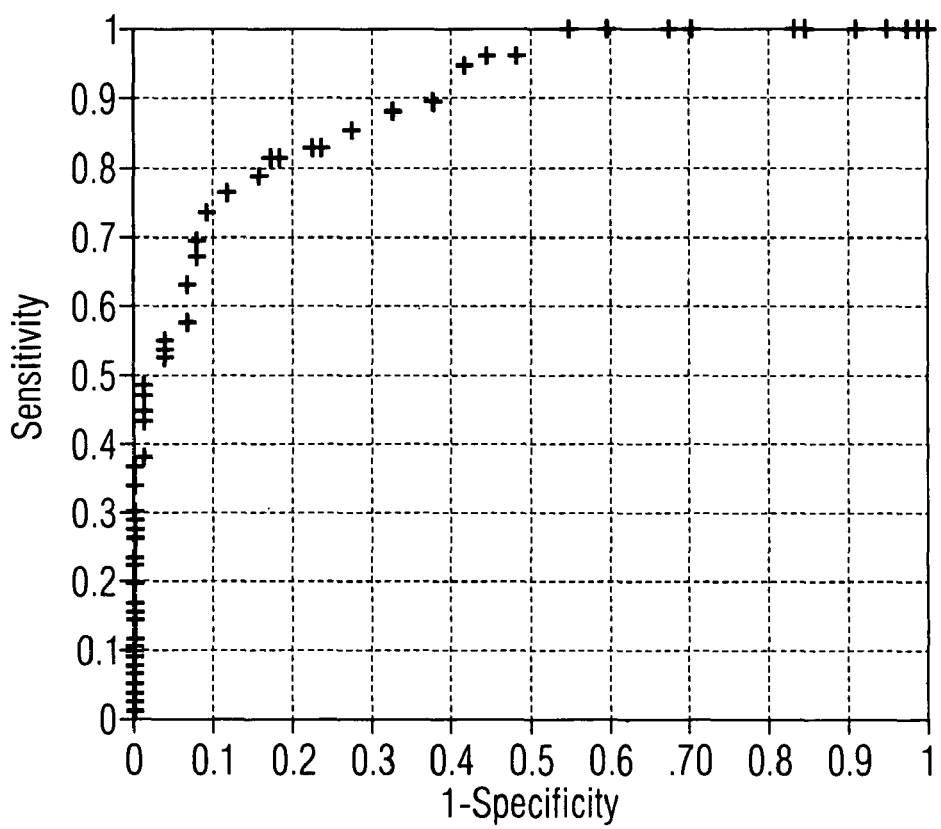
FIG. 6 shows an ROC curve which illustrates the performance of a system according to the invention.

Note from FIG. 6, that the ratios that are most stable (i.e. have the smallest standard deviation as measured on v') are corresponding Left/Right pairs of regions (L/R frontal lobe, etc.). This matches clinicians' intuition.

Figure 7:
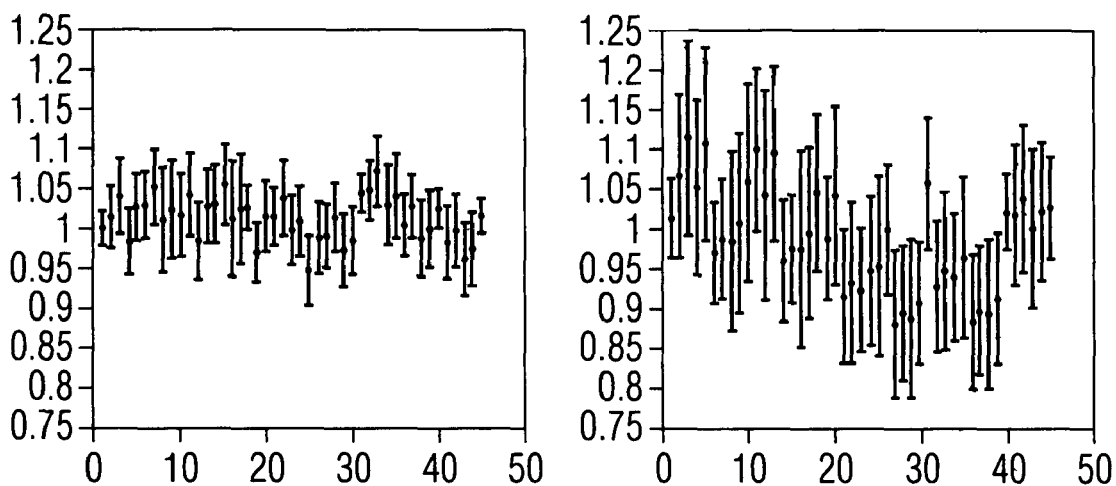
FIG. 7 is a graphical illustration of the data generated during the processing of images according to the invention.

Instead of declaring abnormal anything that is not quite normal, it is possible to increase the discrimination power of the system by making the assumption that the test case is either normal or AD. Referring to FIG. 7, the idea comes from the observation of the distribution of the v' coefficients for normal cases (left) and AD cases (right). This figure shows the ratio coefficients (X-coordinate) corresponding to all possible combinations of 10 regions covering the brain cortex. Each error bar represents the mean plus or minus one standard deviation of each distribution.

Some of normal distributions overlap with AD distributions. This means that the corresponding coefficients are not very useful for the purposes of Normal/AD discrimination. On the other hand, the coefficients for which the distributions are different will be more pertinent for distinguishing the two groups.

Two reference groups are used: one group of normal cases (say, 30) and another group of AD cases (say, 30). A test patient is converted into a v' vector as described in the previous method. v' is then scored both against the normal group's statistical reference and the AD statistical reference. This produces two Z-vectors noted zN and zAD.

Using the vote mechanism described previously, the vector abs(zN)−abs(zAD) is "voted" into a vector defined similarly to the v vector. The ROI abnormality measured in the resulting vector will thus be AD-specific: if a coefficient is "abnormal" (if zN is large) but not in the AD "zone" (if the corresponding zAD is also large) then the case is probably still normal and therefore the contribution to the vote should be minimized (this is effected by using the difference zN−zAD). The operation is mathematically equivalent to performing the votes first and computing the difference afterwards. This is illustrated in the FIG. 8.

Figure 8:
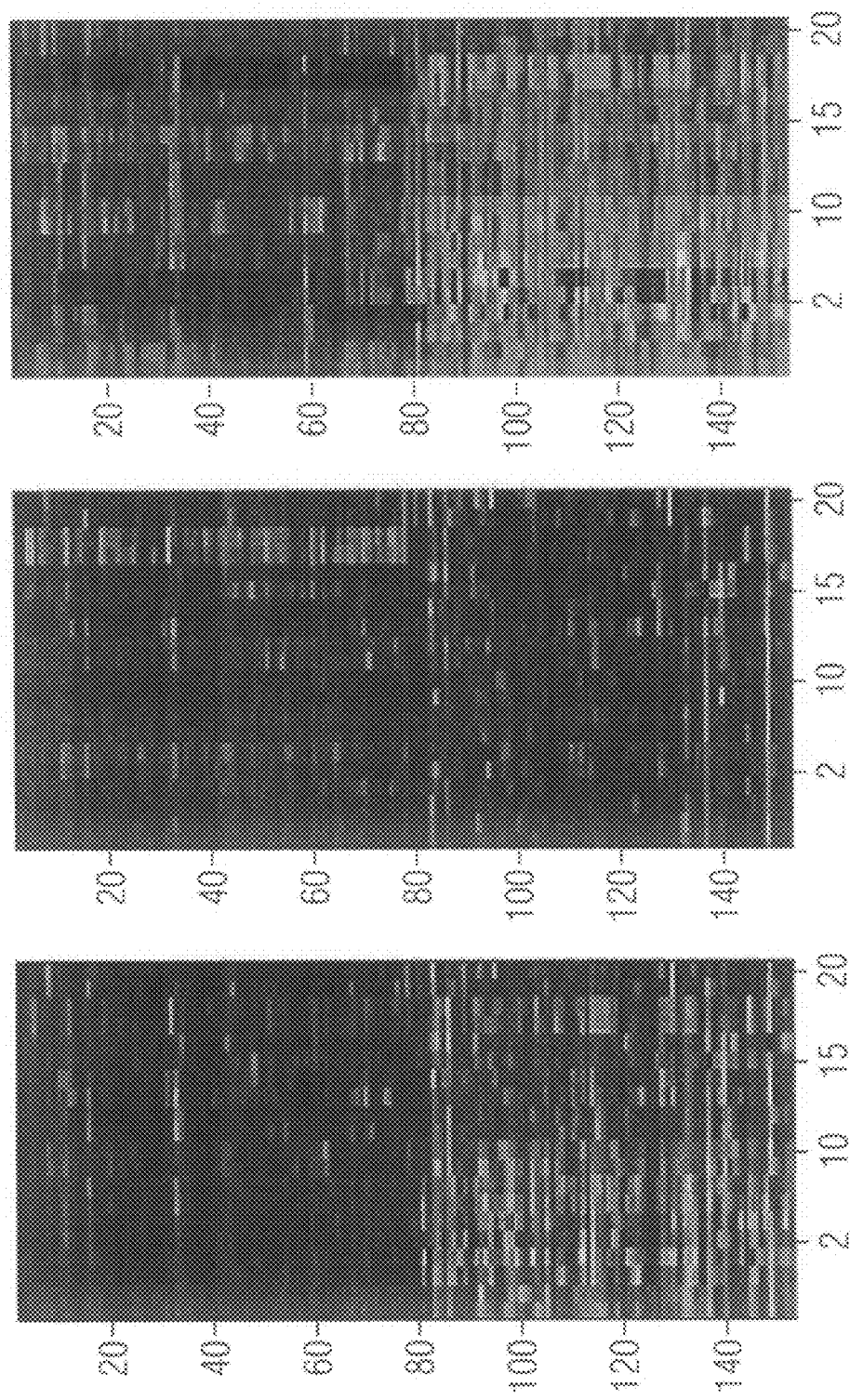
FIG. 8 is a similar illustration to FIG. 5 but further shows comparison with a population displaying Alzheimer's disease and data representing the difference between the two comparisons.

In FIG. 8, the left vote map is the same as in FIG. 5, the middle map is an equivalent map that was computed using an AD atlas. The right-hand side map is the difference of the two and is used as input to the following metric on which a varying threshold can be applied:

$$\text{Max}(\text{vote}(|zN|)-\text{vote}(|zAD|))$$

Figure 9:
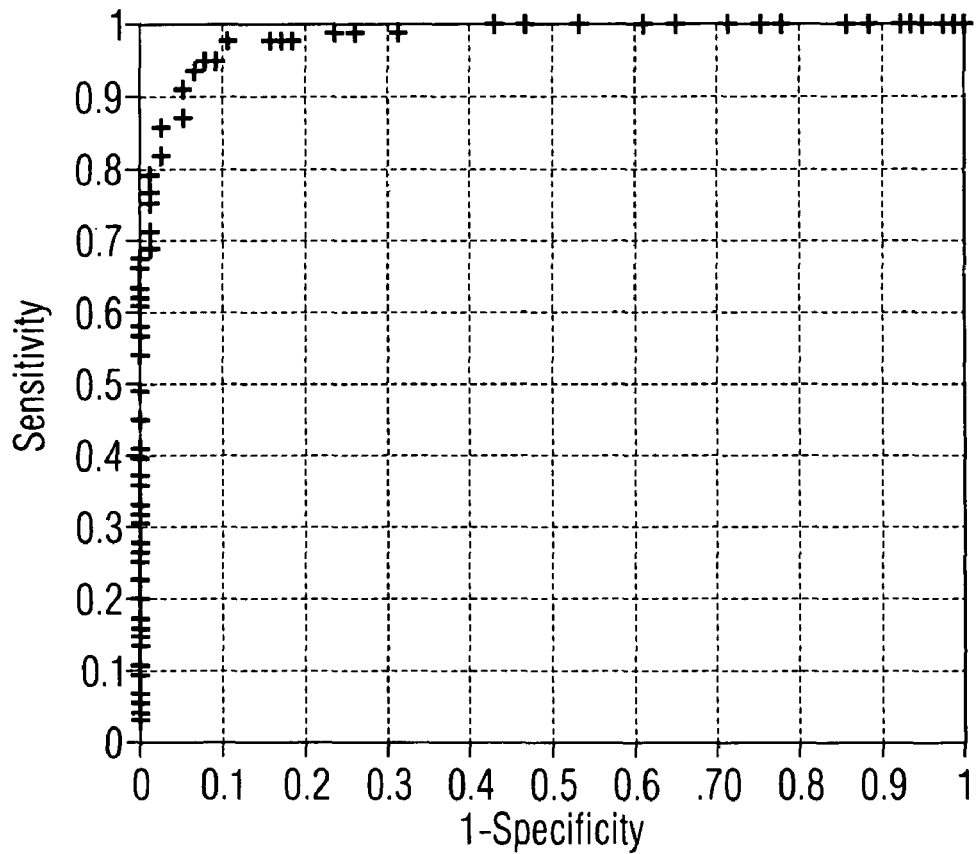
FIG. 9 shows an ROC curve which illustrates the performance of a preferred embodiment of the invention in which test data is compared with a normal population and a population displaying Alzheimer's disease.

The performance of such a system reaches 93/93 with an AUC of more than 0.98 on a population of cases comprising 77 AD, 77 normals, the diagnosis having been performed by expert clinicians. This is illustrated in FIG. 9.

This extension makes the system more robust to the fine selection of ROIs. Where the basic system was relatively sensitive to the selection of ROIs (performance could vary by 10% just by selecting a subset of regions), the extended system using the two reference groups is much less sensitive to this and will be able to use the useful information from the new coefficients. Experience shows that the extended system's performance increases steadily as new regions are added whereas the non-extended system is sensitive to non-relevant regions voting inappropriately.

Figure 10:
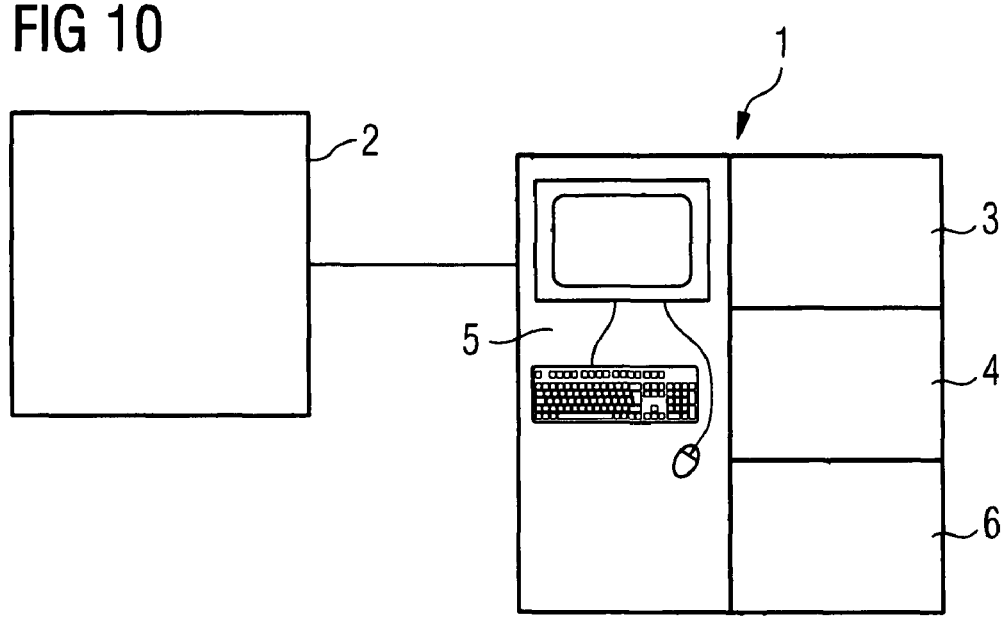
FIG. 10 is a schematic block diagram of a system for performing the method according to the invention.

Referring to FIG. 10, apparatus 1 necessary to carry out the invention processes results obtained from a scanner 2 such as a PET scanner. The apparatus 1 includes a processor 3 and a number of executable applications 4 arranged to perform various steps of the invention. Applications 4 may be implemented as hardware, software or as a combination of the two. The apparatus further includes a Man-Machine Interface (MMI) 5 which allows a user to issue commands which initiate applications 4, and to receive the results of image processing according to the invention. MMI 5 could be implemented as, for example, a display screen-keyboard/mouse combination.

The apparatus 1 further includes a repository 6 which contains the reference data (image data) used to work the invention. In the embodiment illustrated, the repository is show as integral with the other components of the apparatus system, as would be the case if the system were implemented as, e.g. a personal computer, but in other implementations, the repository 5 could be remote from the other components and connected by e.g. a network such as the internet.

In the embodiment shown, the scanner 2 is directly linked to the apparatus 1, providing a convenient route for data to be transferred to the apparatus 1. This should not, however, be seen as limiting and in other embodiments the data could be transferred by any of a number of means including wireless connection, a network connection (e.g. the internet) or the data could be stored on a recording medium such as a CD-ROM for loading in the processing system.

During operation, scanner 2 executes a scan of an object (not shown) and the resulting data is reconstructed to form a test PET image and transferred to the apparatus 1. Alternatively, apparatus 1 could include the facilities necessary for reconstructing the results of the pet scan to produce the test image. A user is then able to interface with the apparatus 1, via MMI 5 and, by running applications 4, is able to define the regions of interest in the test image and corresponding regions in the images represented by the reference data in the repository.

The user can then issue further commands in order to initiate further applications 4 which execute the other processing steps of the invention and which may present the results at MMI5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of comparing a test image with a set of reference images comprising the steps of:
    defining a set of regions of interest (ROIs) in the test image and a corresponding set of ROIs in each of the reference images;
    for each ROI in each image, a data processing unit calculating the value of a chosen linear feature;
    for each image, said data processing unit calculating a set of ratios given by dividing the value of said linear feature in every ROI by the value of said linear feature in every other ROI within the same image; and
    said data processing unit performing statistical analysis of the distribution of ratios to compare the test image to the reference images.

2. The method of claim 1, wherein the linear feature is the mean intensity in the ROI.

3. The method of claim 1, wherein the ROIs are defined by registration of all cases to a single geometric reference.

4. The method of claim 1, wherein the statistical analysis is performed by:
    said data processing unit modelling the distribution of the values of the ratios corresponding to each pair of ROI in the reference images; and
    said data processing unit computing a statistical score ($Z_N$) for each ROI in the test image by statistically positioning the ratio values observed in the test image against the modelled distribution of the ratio values as estimated from the reference images.

5. The method of claim 4, wherein the distributions used for modelling the ratios are Gaussian.

6. The method of claim 4, wherein the positioning is effected via the use of a Z-score or T-score.

7. The method of claim 4, further including the step of:
    for each ROI, said data processing unit computing an abnormality score by summing up all the statistical scores involving this ROI, thus producing an abnormality map defined by one score per ROI.

8. The method of claim 4, further including the steps of:
    defining a set of ROIs in a second set of reference images so that they are in correspondence with those of the test image and first set of reference images;
    said data processing unit modelling the distribution of the values of the ratios corresponding to each pair of ROI in the second set of reference images; and
    said data processing unit computing a statistical score ($Z_A$) for each ROI in the test image by statistically positioning the ratio values observed in the test image against the modelled distribution of the ratio values as estimated from the second set of reference images; and
    said data processing unit performing statistical analysis of the $Z_N$ and $Z_A$ values to compare the test image with both sets of reference images.

9. The method of claim 8, wherein the ROIs are determined by registration to a single geometric reference.

10. The method of claim 8, wherein the statistical analysis is performed to attribute the test image to one of the two populations represented by the two sets of reference images.

11. The method of claim 8, where the statistical analysis involves the step of:
    said data processing unit deriving an abnormality score for each ROI by summing the differences between the absolute values of each $Z_N$ and its corresponding $Z_A$.

12. Apparatus for comparing a test image with a set of reference images comprising:
    a repository containing the set of reference images;
    a Man-Machine Interface;
    and a processor arranged to execute applications which
    facilitate selection by a user of ROIs in the test image and corresponding regions of interest in the reference images;
    calculate a value of a linear feature for each ROI in each image;
    for each image, calculate the set of ratios given by dividing the value of said linear feature in every ROI by the value of said linear feature in every other ROI within the same image; and
    perform statistical analysis of the distribution of ratios to compare the test image to the reference images.

* * * * *